United States Patent
Mori et al.

(10) Patent No.: US 10,338,645 B2
(45) Date of Patent: Jul. 2, 2019

(54) INFORMATION PROCESSING APPARATUS, IMAGE PROJECTION CONTROL METHOD, AND PROGRAM

(71) Applicant: LENOVO (SINGAPORE) PTE. LTD., Singapore (SG)

(72) Inventors: Mikako Mori, Yokohama (JP); Tatsumi Nagasawa, Yokohama (JP); Hideshi Tsukamoto, Yokohama (JP)

(73) Assignee: LENOVO (SINGAPORE) PTE. LTD., Singapore (SG)

( * ) Notice: Subject to any disclaimer, the term of this patent is extended or adjusted under 35 U.S.C. 154(b) by 0 days.

(21) Appl. No.: 15/683,424

(22) Filed: Aug. 22, 2017

(65) Prior Publication Data

US 2018/0335811 A1 Nov. 22, 2018

(30) Foreign Application Priority Data

May 18, 2017 (JP) .................. 2017-098936

(51) Int. Cl.
*G06F 1/16* (2006.01)
*G09G 3/00* (2006.01)
*G06F 1/3206* (2019.01)
*G06F 1/3234* (2019.01)

(52) U.S. Cl.
CPC .......... *G06F 1/1694* (2013.01); *G06F 1/1639* (2013.01); *G06F 1/3206* (2013.01); *G06F 1/3265* (2013.01); *G09G 3/001* (2013.01); *G09G 2330/021* (2013.01); *G09G 2354/00* (2013.01)

(58) Field of Classification Search
CPC ..... G06F 1/1694; G06F 1/1639; G09G 3/001; G09G 2330/021; G09G 2354/00
See application file for complete search history.

(56) References Cited

U.S. PATENT DOCUMENTS

| 9,292,102 B2 * | 3/2016 | Nasiri ..................... A63F 13/06 |
| 2016/0274722 A1 * | 9/2016 | Putzolu ................. G06F 1/1616 |
| 2017/0357427 A1 * | 12/2017 | Wilson .................... G04G 9/02 |

FOREIGN PATENT DOCUMENTS

JP 2016164839 A 9/2016

* cited by examiner

*Primary Examiner* — Charles V Hicks
(74) *Attorney, Agent, or Firm* — Shimokaji IP

(57) ABSTRACT

An object of the present invention is to suppress wasted power consumption while improving user friendliness for an on/off operation of an image projection device. An information processing apparatus includes: an orientation detection unit configured to detect the orientation of a lens of an image projection device; and a control unit configured to turn off the image projection unit or perform control not to turn on the image projection device when the lens of the image projection device is in an exposed state and when an angle between the orientation of the lens detected by the orientation detection unit and the vertical direction falls within a preset angular range.

4 Claims, 4 Drawing Sheets

US 10,338,645 B2

INFORMATION PROCESSING APPARATUS, IMAGE PROJECTION CONTROL METHOD, AND PROGRAM

FIELD OF THE INVENTION

The present invention relates to an information processing apparatus, an image projection control method, and a program.

BACKGROUND OF THE INVENTION

For example, in a scene such as a presentation scene, an image projection device (projector), as an external device, is connected to an information processing apparatus such as a personal computer to project, on a projected surface such as a screen or a wall, an image data transmitted from the information processing apparatus as a projected image. For example, Patent Document 1 discloses an information processing apparatus, where a connector assembly having improved visibility in a dim environment is so provided that an external device such as an image projection device or the like can be connected easily to an external terminal of the information processing apparatus even in a dim room.

Further, an information processing apparatus equipped with an image projection device has been recently proposed.

[Patent Document 1] Japanese Patent Application Laid-Open No. 2016-164839

SUMMARY OF THE INVENTION

When an image projection device is connected as an external device to an information processing apparatus, on/off switching of the image projection device is generally performed by a user operating a power button provided on the image projection device.

In the case of an information processing apparatus equipped with an image projection device, on/off switching of the image projection device is performed by a user operating a start button of the image projection device provided on the information processing apparatus or performing an operation on a setting screen to control on/off of the image projection device.

In any of these cases, the user is required to perform a specific operation for on/off switching of the image projection device separately from the operation of the information processing apparatus, resulting in low user friendliness. Further, the user could forget to turn off the image projection device. In this case, power is wasted.

The present invention has been made in view of the above circumstances, and it is an object thereof to provide an information processing apparatus, an image projection control method, and a program capable of suppressing wasted power consumption while improving user friendliness for an on/off operation of an image projection device.

An information processing apparatus according to the first aspect of the present invention includes: an orientation detection unit configured to detect an orientation of a lens of an image projection unit; and a control unit configured to turn off the image projection unit or perform control not to turn on the image projection unit when the lens of the image projection unit is in an exposed state and when an angle between the orientation of the lens detected by the orientation detection unit and the vertical direction falls within a preset angular range.

An information processing apparatus according to the second aspect of the present invention is an information processing apparatus that supports two or more use modes, which includes: a mode identification unit configured to identify each of the use modes; and a control unit configured to turn off an image projection unit or perform control not to turn on the image projection unit according to the use mode identified by the mode identification unit.

An information processing apparatus according to the third aspect of the present invention includes: a projection environment detecting unit configured to detect a projection environment of an image projection unit; and a control unit configured to turn off the image projection unit or perform control not to turn on the image projection unit when the image projection environment meets a preset, predetermined condition.

The above-described aspects of the present invention can suppress wasted power consumption while improving user friendliness for an on/off operation of an image projection device.

DETAILED DESCRIPTION OF THE INVENTION

First Embodiment

An information processing apparatus, an image projection control method, and a program according to a first embodiment of the present invention will be described below with reference to the accompanying drawings. In the embodiment, the description is made by taking, as the information processing apparatus, a tablet PC equipped with an image projection device (projector), but the scope of the present invention is not limited to this configuration. The information processing apparatus may also be any other information processing apparatus having an external connection terminal to which an image projection device as an external device is connectable. Further, the information processing apparatus of the present invention is not limited to the tablet type information processing apparatus. For example, the information processing apparatus may be a laptop PC, or a 2in1 information processing apparatus usable both as a laptop PC and a tablet PC.

Figure 1:
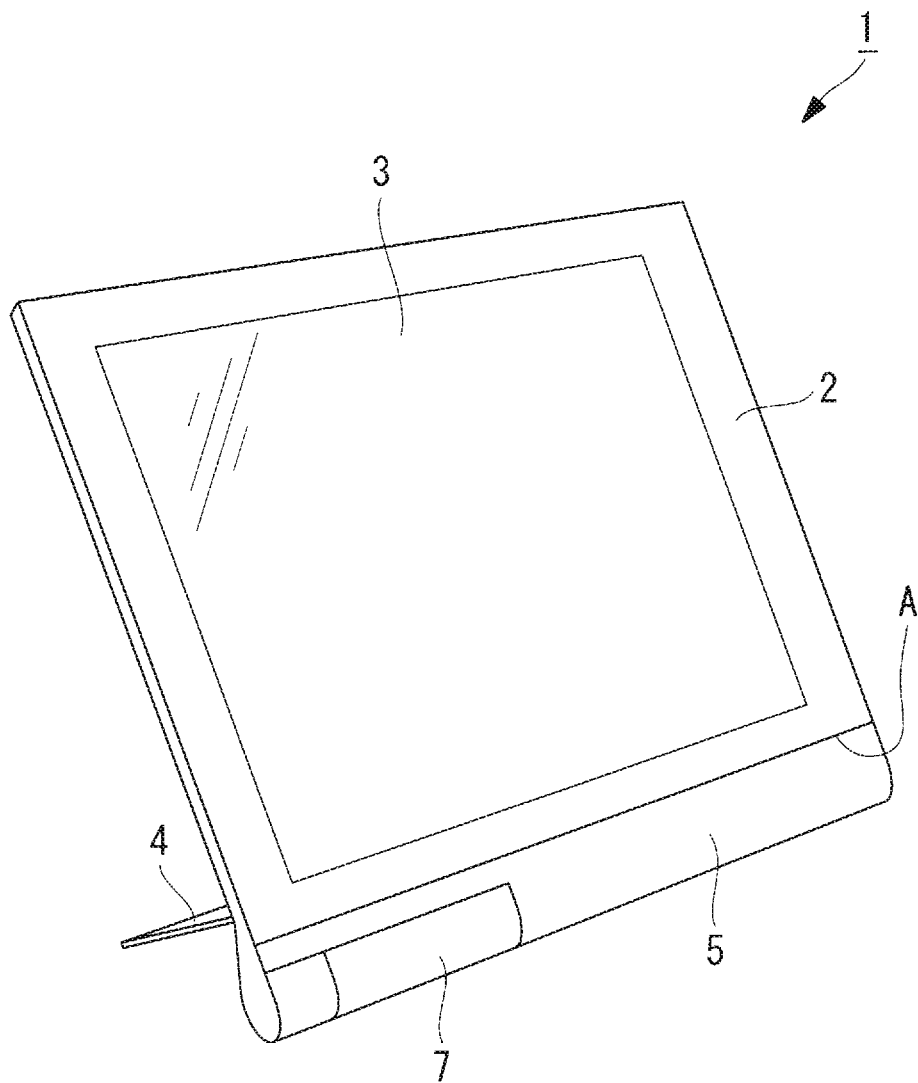
FIG. 1 is a schematic external view of an information processing apparatus according to a first embodiment of the present invention, which illustrates the state of a stand mode.

FIG. 1 is a schematic external view of an information processing apparatus 1 according to the embodiment. As illustrated in FIG. 1, the information processing apparatus 1 according to the embodiment is a tablet PC including a plate-like chassis 2, a touch panel 3 provided on the front side of the chassis 2, and a stand mechanism 4 provided on the backside of the chassis 2. The stand mechanism 4 is, for example, connected to the backside of the chassis 2 by a hinge. For example, the chassis 2 is formed into a substantially rectangular shape in plan view. A supporting member 5 formed into a substantially cylindrical shape and having an axial direction parallel to a first lateral side A is formed integrally with the first lateral side A as the long side of the chassis 2. A lens unit 7 of the image projection device is provided in the supporting member 5 rotatably about the axis of the supporting member 5. The lens unit 7 can be rotated about the axis of the supporting member 5 to expose a lens 8 (see FIG. 2) included in the lens unit 7 to put the lens 8 into a projectable state, or house the lens 8 in the supporting member 5 to protect the lens 8.

For example, the information processing apparatus 1 supports three use modes, i.e., a tablet mode, a stand mode, and a stylus mode. The tablet mode is a state in which the stand mechanism 4 is housed to adhere tightly to the backside of the chassis 2, which provides a form usable for a user while holding the information processing apparatus 1 in user's hand.

In the stand mode, the stand mechanism 4 is opened at a predetermined angle as illustrated in FIG. 1, and the information processing apparatus 1 is supported by the stand mechanism 4 and the supporting member 5 formed on the first lateral side A of the chassis 2. In the stand mode, the chassis 2 is supported at an angle nearly perpendicular to the installation surface, and this is suitable, for example, to see an image(s) displayed on the touch panel 3.

Figure 2:
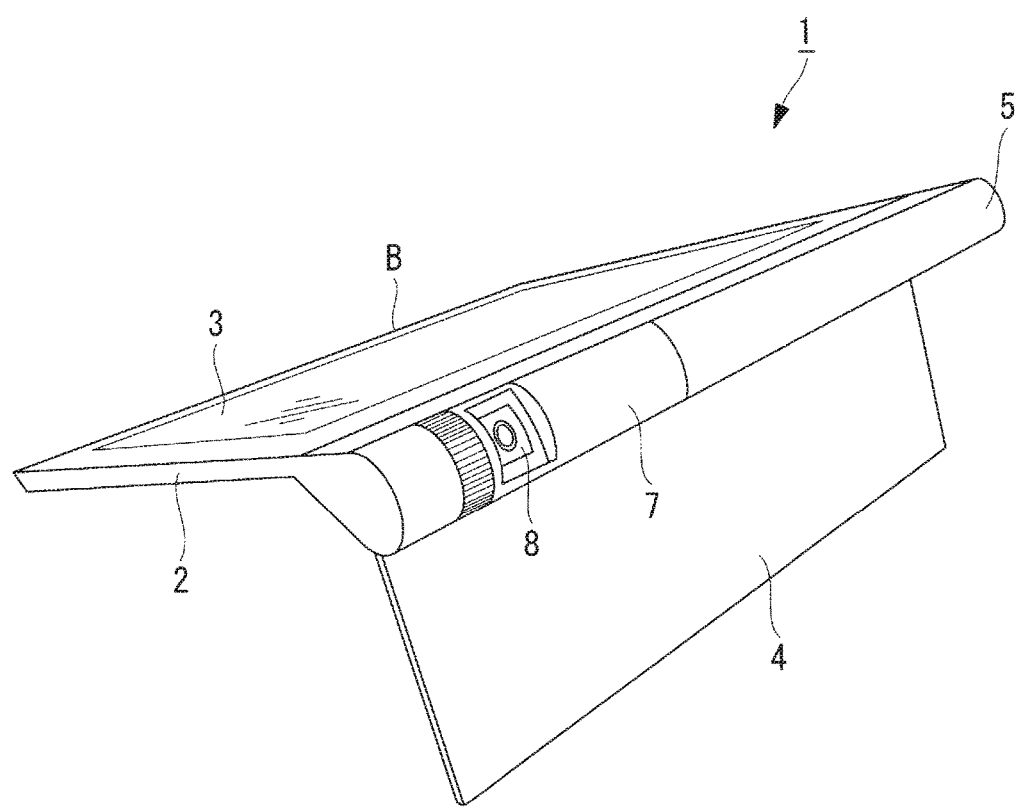
FIG. 2 is a schematic external view of the information processing apparatus according to the first embodiment of the present invention, which illustrates the state of a stylus mode.

In the stylus mode, the stand mechanism 4 is opened at a predetermined angle as illustrated in FIG. 2, and the information processing apparatus 1 is supported by the stand mechanism 4 and a second lateral side B opposite to the first lateral side A of the chassis 2. In the stylus mode, the chassis 2 is supported at an angle of approximately 45° to the installation surface, and this is suitable, for example, for drawing using a stylus pen or the like. Unlike in the stand mode, the attitude of the lens unit 7 is kept not to contact with the installation surface in the stylus mode, and this is also suitable for image projection.

Thus, the information processing apparatus 1 can switch among the use modes by changing the attitude of the chassis 2.

Figure 3:
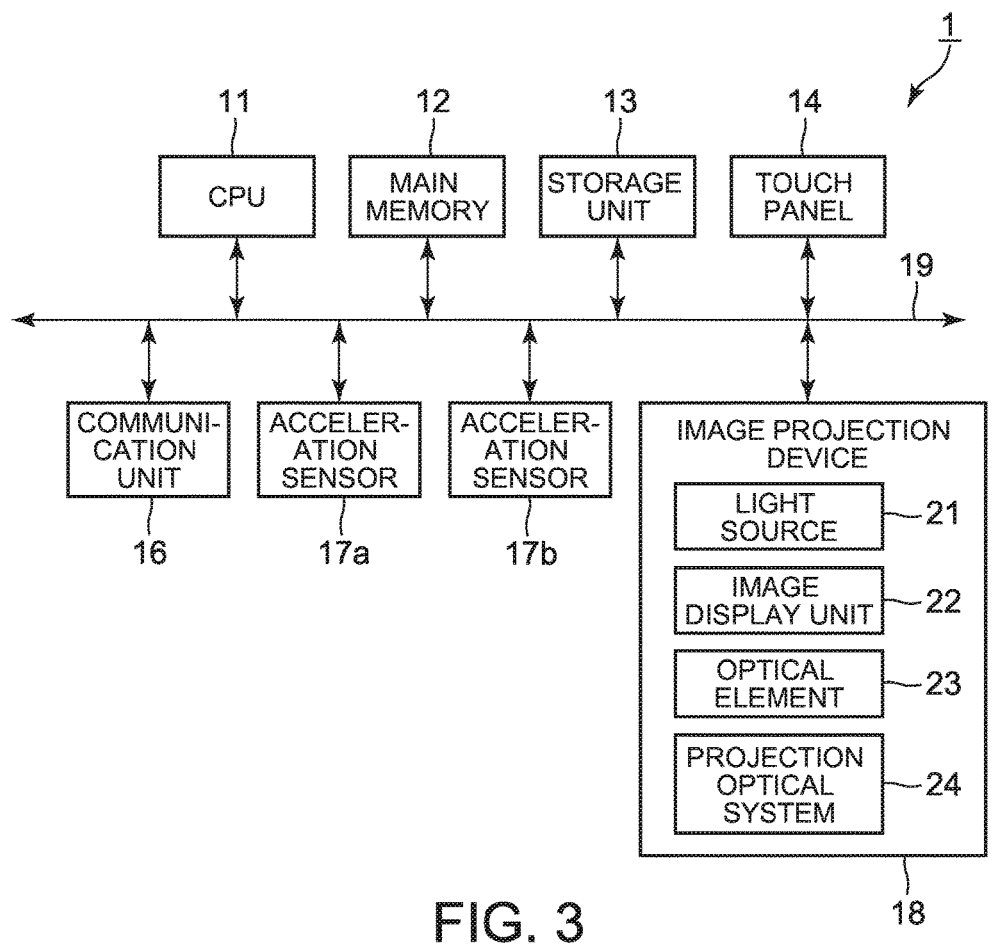
FIG. 3 is a block diagram illustrating the hardware configuration of the information processing apparatus according to the first embodiment of the present invention.

FIG. 3 is a block diagram illustrating the hardware configuration of the information processing apparatus 1 according to the embodiment. For example, the information processing apparatus 1 includes a CPU (Central Processing Unit) 11, a main memory 12, a storage unit 13, a touch panel 14, a communication unit 16, acceleration sensors 17a, 17b, and an image projection device 18. These units are connected to one another directly or indirectly through a bus 19.

For example, the CPU 11 controls the entire information processing apparatus 1 under an OS (Operating System) stored in the storage unit 13 connected through the bus 19, and executes various programs stored in the storage unit 13 to execute various processes such as image projection control to be described later.

The main memory 12 is composed of writable memories such as a cache memory and a RAM (Random Access Memory). The main memory 12 is used as a working memory to read a program executed by the CPU 11 and write data processed by the execution program.

The storage unit 13 is, for example, a ROM (Read Only Memory), an HDD (Hard Disk Drive), a flash memory, and the like to store the OS, such as Windows (registered trademark), iOS (registered trademark), Android (registered trademark), or the like, to control the entire information processing apparatus 1, various hardware drivers for operating peripheral devices, applications for use in specific business, various data and files, and the like.

Further, in the storage unit 13, an image projection control program used to perform control of the image projection device 18 to be described later and various data necessary to perform the image projection control are stored. The image projection control program stored in the storage unit 13 may be a program downloaded from a predetermined server or installed and stored from a predetermined recording medium, or a program stored in the storage unit at the time of manufacturing.

The touch panel 14 has the functions of both a display unit and an input unit to provide a display based on an instruction from the CPU 11 and output input information to the CPU 11 based on an input operation from the user.

The communication unit 16 is an interface to connect to a network and communicate with another apparatus in order to exchange information.

The acceleration sensor (G sensor) 17a is provided in the chassis 2. The acceleration sensor 17a detects the attitude of the chassis 2 with respect to the direction of gravitational force.

The acceleration sensor (G sensor) 17b is provided in the lens unit 7. The acceleration sensor 17b detects the orientation of the lens 8 in the lens unit 7 with respect to the direction of gravitational force, i.e., the projection direction.

For example, the image projection device 18 includes a light source 21 which emits light, an image display unit 22 having a modulation element to form an image using the light from the light source 21, multiple optical elements 23 which guide the light from the light source 21 to the image display unit 22, and a projection optical system 24 configured to enlarge and project the image formed by the image display unit 22. The projection optical system 24 includes the lens 8 illustrated in FIG. 2. As the configuration of the image projection device 18, any known technique can be adopted, and the detailed description thereof will be omitted here. Further, the on/off of the light source included in the image projection device, the control of the image display unit 22, on-off control of the image projection device 18, and the like are performed by the CPU 11 reading the image projection control program stored in the storage unit 13 into the main memory 12 and executing the image projection control program.

Figure 4:
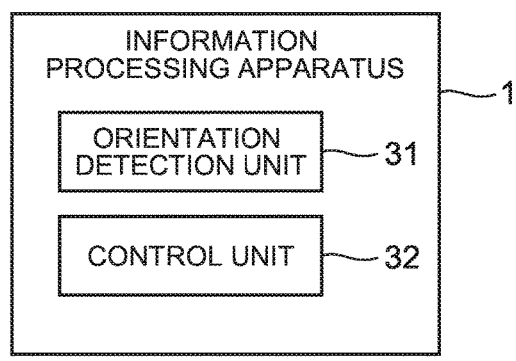
FIG. 4 is a functional block diagram mainly illustrating functions related to image projection control among the functions of the information processing apparatus according to the first embodiment of the present invention.

FIG. 4 is a functional block diagram mainly illustrating functions related to on-off control of the image projection device 18 among the functions of the information processing apparatus 1. As illustrated in FIG. 4, for example, the information processing apparatus 1 includes an orientation detection unit 31 and a control unit 32.

The orientation detection unit 31 is a function implemented, for example, by the acceleration sensor 17b mentioned above. Further, for example, the control unit 32 to be described later is implemented by the CPU 11 of the information processing apparatus 1 reading the image projection control program stored in the storage unit 13 as mentioned above, specifically an on-off control program included in the image projection control program, into the main memory 12 and executing the program.

The orientation detection unit 31 detects an angle between the vertical direction (the direction of gravitational force) and the orientation of the lens 8, and outputs the detected value to the control unit 32.

When the lens 8 is in an exposed state, and the angle detected by the orientation detection unit 31 between the vertical direction and the orientation of the lens 8, that is, the angle of the projection direction to the vertical direction is within a preset angular range, the control unit 32 turns off the image projection device 18 or performs control not to turn on the image projection device 18.

Here, "turning off the image projection device" means a state in which no light is emitted at least from the lens 8 of the image projection device 18. As an example, the control of turning off the image projection device 18 is to shut off the power supply to the image projection device 18, turn off the light source 21 of the image projection device 18, or the like.

Further, "turning on the image projection device" means a state in which light is emitted from the lens 8 of the image projection device 18. Therefore, the "control not to turn on the image projection device" means control not to put the image projection device into such a state. As an example, there is the control of invalidating input even with the user's operation to the start button of the image projection device 18, or the control of disabling the start button of the image projection device 18 from being physically operated.

Figure 5:
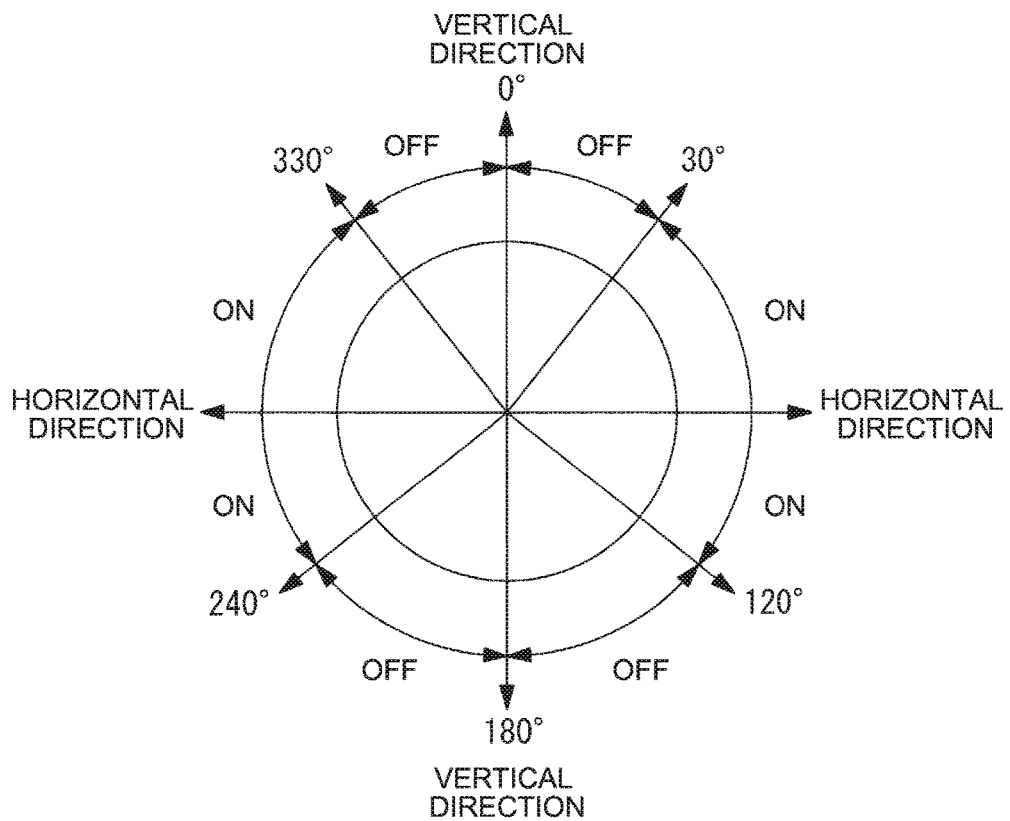
FIG. 5 is a diagram for describing the orientation of a lens and an angular range according to the first embodiment of the present invention.

Further, for example, the preset angular range means an angular range of angles between orientations of the lens (projection directions), assumed that the user does not intend to perform image projection, and the vertical direction. In general, image projection is often performed almost in the horizontal direction, and image projection in the vertical direction is very rare. Therefore, for example, when the upward vertical direction is set as a reference (0°) as illustrated in FIG. 5, an angular range in which the orientation of the lens (projection direction) is not less than 0° and not more than 30°, an angular range of not less than 120° and not more than 240°, and an angular range of not less than 330° and less than 360° are preset as angular ranges to turn off the image projection device. Note that this angular range setting is just an illustrative example, and the present invention is not limited to the angular range setting. Further, predetermined angular ranges may be set by default so that the user can change the angular ranges arbitrarily. Thus, making the angular ranges variable enables the setting of angular ranges to suit to the usage pattern of the user, thereby improving usability.

Next, on-off control when the user performs an operation for image projection on the information processing apparatus 1 according to the embodiment will be specifically described.

First, for example, when the user performs image projection, the information processing apparatus 1 is set to the attitude of the stylus mode, the lens unit 7 is rotated to expose the lens 8, and the lens unit 7 is further rotated until the lens 8 faces a direction desirable for image projection. Then, when the user operates a start button (unillustrated) for image projection, the control unit 32 determines whether an angle input from the orientation detection unit 31 corresponds to a preset angular range. As a result, when the angle detected by the orientation detection unit 31 is out of a predetermined angular range, it is determined to be an appropriate projection direction, and hence the operation of the start button is validated to make image projection possible. Thus, image data and the like desired by the user are projected as a projected image on the projected surface located forward in the projection direction.

On the other hand, when the angle detected by the orientation detection unit 31 is in the predetermined angular range, control is performed to invalidate the user's start operation not to start image projection. Thus, image projection at an undesirable angle can be prevented and hence wasted power consumption can be avoided.

When the image projection is finished, the user rotates the lens unit 7 to protect the lens 8. In this case, the control unit 32 turns off the image projection device 18 when the angle between the orientation of the lens and the vertical direction falls within the predetermined angular range. This allows the off-operation of the image projection device 18 to be performed concurrently during the user's operation to rotate the lens unit 7 in order to protect the lens 8. Thus, since the image projection device 18 is automatically turned off without requiring the user to power off the image projection device 18, the user friendliness of the image projection device 18 can be improved, and forgetting to power off the image projection device can also be prevented. Further, when the user rotates the lens unit 7 in a state of standing forward in the projection direction, light from the light source 21 gets into user's eye during rotation in the conventional usage. However, in the embodiment, since the emission of light from the lens 8 is stopped during the rotation of the lens unit 7, no light gets into user's eye.

As described above, according to the information processing apparatus 1, the image projection control method, and the program of the embodiment, since the image projection device 18 is controlled not to be turned off or on when the angle between the orientation of the lens and the vertical direction is in a predetermined angular range, the rotation angle of the lens 8 or the attitude of the chassis 2 provided with the lens 8 can be changed to perform the off-operation of the image projection device 18 easily. This can improve user friendliness related to the on/off operation of the image projection device 18.

In the embodiment, although the case where the lens unit 7 of the image projection device 18 is rotatably provided in the chassis 2 is exemplified, the lens unit 7 may be configured not to be rotatable with respect to the chassis 2. In this case, since the orientation of the lens is linked with the attitude of the chassis 2, the acceleration sensor 17a provided in the chassis 2 may also be used, for example, as the orientation detection unit 31.

Further, in the embodiment, although the case where the image projection device 18 is provided in the chassis 2 is exemplified, the image projection device 18 may be connected as an external device to the information processing apparatus 1 through a predetermined external connection terminal. In this case, the image projection device 18 is required to include a unit for detecting the orientation of the lens 8, for example, the acceleration sensor 17b. Further, the on-off control of the image projection device 18 in this case is performed by exchanging necessary information between the image projection device 18 and the information processing apparatus 1 through the communication unit 16.

Further, in the embodiment, although the on-operation of the image projection device 18 is performed by the user, the control unit 32 may also perform the on-operation automatically. For example, when the angle between the orientation of the lens and the vertical direction is out of a predetermined angular range, the control unit 32 may turn on the image projection device 18 automatically.

Second Embodiment

Next, an information processing apparatus, an image projection control method, and a program according to a second embodiment of the present invention will be described with reference to the accompanying drawings. Like in the first embodiment mentioned above, description will be made by taking, as an example, a tablet type information processing apparatus equipped with an image projection device 18 in the embodiment as well, but the information processing apparatus of the present invention is not limited to this example like in the first embodiment.

An information processing apparatus 1' according to the embodiment has a similar configuration to the information processing apparatus 1 according to the first embodiment mentioned above, and a different point is that the image projection device 18 is turned off according to the use mode. In other words, the information processing apparatus 1' according to the embodiment supports three use modes, i.e., the tablet mode, the stand mode, and the stylus mode as described in the above first embodiment, and determines whether to turn off the image projection device 18 according to each of these use modes.

Hereinafter, the information processing apparatus 1' according to the embodiment will be described mainly in points different from the information processing apparatus 1 according to the first embodiment to omit the description of the configuration common to that of the first embodiment.

Figure 6:
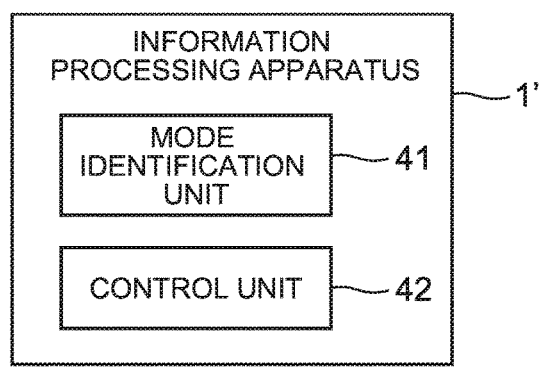
FIG. 6 is a functional block diagram mainly illustrating functions related to image projection control among the functions of an information processing apparatus according to a second embodiment of the present invention.

FIG. 6 is a functional block diagram mainly illustrating functions related to on-off control of the image projection device 18 among the functions of the information processing apparatus 1' according to the embodiment. As illustrated in FIG. 6, the information processing apparatus 1' according to the embodiment includes a mode identification unit 41 and a control unit 42.

The mode identification unit 41 identifies a current use mode from among the tablet mode, the stand mode, and the stylus mode mentioned above. For example, the use mode is identified based on a detection value of the acceleration sensor 17a provided in the chassis 2.

In the case of the tablet mode, since the information processing apparatus 1' is often held by the user, the detection value of the acceleration sensor 17a varies frequently. Therefore, when the detection value of the acceleration sensor 17a is constant during a predetermined period or more, it is determined to be any mode other than the tablet mode. When the information processing apparatus 1' has a sensor to detect the opened/closed state of the stand mechanism 4, it may be determined whether the use mode is the tablet mode or any other use mode according to the opened/closed state of the stand mechanism 4.

In the case of the stand mode, the chassis 2 is supported with a nearly perpendicular attitude relative to the direction of gravitational force (see FIG. 1), and in the case of the stylus mode, the chassis 2 is supported with a nearly horizontal attitude (see FIG. 2). Therefore, for example, the mode identification unit 41 has an angular range with respect to the horizontal plane of the chassis 2 in the stand mode and an angular range with respect to the horizontal plane of the chassis 2 in the stylus mode to determine the stand mode or the stylus mode using the angular range and the detection value of the acceleration sensor 17a.

The control unit 42 turns off the image projection device 18 or performs control not to turn on the image projection device 18 according to the use mode detected by the mode identification unit 41. For example, when the mode identification unit 41 determines the tablet mode or the stand mode, the control unit 42 turns off the image projection device 18 or performs control not to turn on the image projection device 18. When the mode identification unit 41 determines the stylus mode, the control unit 42 allows the on-operation of the image projection device 18.

As described above, according to the information processing apparatus 1', the image projection control method, and the program of the embodiment, on/off of the image projection device can be switched according to the use mode of the information processing apparatus 1. Thus, for example, when image projection is to be stopped temporarily during image projection in the stylus mode, the image projection can be turned off with such a simple operation as to switch the attitude of the chassis 2 from the stylus mode to the stand mode. Further, in this case, when the attitude is changed from the stand mode to the stylus mode, the control unit 42 may perform control to restart the image projection. Thus, the on/off of the image projection device 18 is switched according to the use mode, i.e., according to the change in the attitude of the chassis 2 to allow the user to turn on or off the image projection device 18 easily.

In the embodiment, the description is made by taking, as an example, the information processing apparatus 1' that supports three use modes, but the use modes are not limited to this example, and any other information processing apparatus supporting at least two use modes may be used. Further, in the embodiment, image projection can be performed in the stylus mode, and image projection cannot be performed in the stand mode and the tablet mode, but the use modes to turn off the image projection device are not limited to this example. In other words, since the use mode suitable for image projection varies according to the mounting position of the lens unit 7 or the like, a use mode(s) to turn off the image projection device may be set appropriately in view of the mounting position of the lens unit 7 and the attitude of the chassis 2 in each use mode.

Further, the lens unit 7 provided in the chassis 2 may be rotatable with respect to the chassis 2, or may be mounted to be unrotatable with respect to the chassis 2.

Further, in the embodiment, the description is made by taking, as an example, the case where the image projection device 18 is provided in the chassis 2, but the image projection device 18 may be connected as an external device to the information processing apparatus 1 through a predetermined external connection terminal. Even in this case, the on/off of the image projection device 18 as the external device is controlled according to the use mode of the chassis 2. The advantage of this case is that the on/off of the image projection device 18 as the external device can be controlled according to the attitude of the chassis 2 that the user has on hand. For example, when the image projection device 18 is connected as the external device to the information processing apparatus 1', the image projection device 18 is likely to be installed remotely. Even in such a case, the user can switch on/off of the image projection device 18 installed remotely with such an operation as to switch between use modes of the information processing apparatus 1' on hand, such as to change the attitude of the chassis 2 from the stylus mode to the stand mode. Thus, this case has an advantage of being able to use the information processing apparatus 1' as a so-called remote control of the image projection device 18.

While the present invention has been described above with reference to each of the aforementioned embodiments, the technical scope of the present invention is not limited to the scope of the aforementioned embodiments. Various changes or modifications can be added to the aforementioned embodiments without departing from the scope of the invention, and forms to which such changes or modifications are added shall be included in the technical scope of the present invention. Further, the aforementioned embodiments may be combined arbitrarily.

For example, the first embodiment and the second embodiment may be combined to perform control to turn off the image projection device 18 or the like using both the use mode of the information processing apparatus and the orientation of the lens. In this case, the off-control or the like is performed when the angle between the orientation of the lens and the vertical direction in the stylus mode is in a predetermined angular range. In the stand mode and the tablet mode, even when the user operates the start button of the image projection device 18, the operation is invalidated to control not to turn on the image projection device 18.

Further, in each of the aforementioned embodiments, on-off control of the image projection device is performed according to the angular range of the orientation of the lens (projection direction) and/or the use mode. However, instead of or in addition to this, on-off control of the image projection device 18 may also be performed according to a projection environment in which image projection is performed. For example, when image projection is performed, an environment around the image projection device 18 is darkened. Therefore, for example, an illuminance sensor may be provided to turn off the image projection device 18 or perform control not to turn on the image projection device 18 when the detection value of the illuminance sensor is equal to or more than a predetermined illuminance. Further, for example, when the lens 8 is in contact with or in proximity to the projected surface, this situation is not suitable for image projection. Therefore, a distance sensor may be provided to detect distance from the lens 8 to the projected surface so as to turn off the image projection device 18 or disable turning on the image projection device 18 when the distance detected by this distance sensor is equal to or less than a predetermined value.

We claim:

1. An information processing apparatus, comprising:
    an orientation detection unit configured to detect an orientation of a lens in a lens unit of an image projection unit;
    wherein the lens unit is rotatable independently of a chassis orientation of the information processing apparatus;
    an acceleration sensor in the lens unit, wherein the sensor detects an orientation of the lens in the lens unit with respect to a direction of gravitational force;
    a control unit configured to perform control not to turn on the image projection unit (i) when the lens of the image projection unit is in an exposed state whereby the lens is exposed to an environment external to the apparatus, and (ii) when an angle between the orientation of the lens detected by the orientation detection unit and a vertical direction falls within a preset angular range; and
    the control unit is further configured to enable image projection (i) when the lens of the image projection unit is in an exposed state whereby the lens is exposed to an environment external to the apparatus, and (ii) when an angle between the orientation of the lens detected by the orientation detection unit and a vertical direction falls outside of the preset angular range;
    the control unit is further configured to enable automatic off-operation of the image projection unit during rotation of the lens unit to protect the lens.

2. The information processing apparatus according to claim 1, wherein the lens unit is mounted, via a supporting member of the chassis, rotatably with respect to the chassis.

3. An information processing apparatus that supports a plurality of use modes, comprising:
    a mode identification unit configured to identify each of the use modes;
    wherein the use modes include a tablet mode, a stand mode, and a stylus mode;
    wherein, in the tablet mode, a stand mechanism is housed to adhere tightly to a backside of a chassis of the apparatus to provide a form usable for a user while holding the apparatus in a hand of the user;
    wherein, in the stand mode, the stand mechanism is opened at a predetermined stand angle, whereby the apparatus is supported by the stand mechanism and a supporting member on a first lateral side of the chassis, wherein the chassis is at an angle nearly perpendicular to an installation surface on which the apparatus can rest;
    wherein, in the stylus mode, the stand mechanism is opened at a predetermined stylus angle, whereby the apparatus is supported by the stand mechanism and a second lateral side of the chassis, wherein the second lateral side is opposite to the first lateral side, wherein the chassis is at an angle of approximately 45° to the installation surface; and
    a control unit configured to turn off an image projection unit or perform control not to turn on the image projection unit according to the use mode identified by the mode identification unit;
    a lens unit controlled by the control unit;
    wherein the lens unit is rotatable independently of the use mode of the information processing apparatus;
    an acceleration sensor in the lens unit, wherein the sensor detects an orientation of the lens in the lens unit with respect to a direction of gravitational force;
    the control unit is configured to perform control prevent image projection (i) when the lens of the image projection unit is exposed to an environment external to the apparatus, and (ii) when an angle between the orientation of the lens detected by the orientation detection unit and a vertical direction falls within a preset angular range; and
    the control unit is further configured to enable image projection (i) when the lens of the image projection unit is exposed to an environment external to the apparatus, and (ii) when an angle between the orientation of the lens detected by the orientation detection unit and a vertical direction falls outside of the preset angular range.

4. The information processing apparatus according to claim 3, further comprising:
    an acceleration sensor provided in the chassis,
    wherein the mode identification unit identifies a use mode based on an output from the acceleration sensor.

* * * * *